United States Patent

Harman

Patent Number: 5,934,877
Date of Patent: Aug. 10, 1999

[54] ROTOR WITH LOGARITHMIC SCALED SHAPE

[76] Inventor: Jayden David Harman, Research Vessel "PA", Fremantle Fishing Boat Harbour, South Fremantle, Western Australia, Australia

[21] Appl. No.: 08/983,308

[22] PCT Filed: Jul. 8, 1996

[86] PCT No.: PCT/AU96/00427

§ 371 Date: Feb. 17, 1998

§ 102(e) Date: Feb. 17, 1998

[87] PCT Pub. No.: WO97/03291

PCT Pub. Date: Jan. 30, 1997

[30] Foreign Application Priority Data

Jul. 10, 1995 [AU] Australia .................................. PN4072
Sep. 5, 1995 [AU] Australia .................................. PN5249
Mar. 11, 1996 [AU] Australia .................................. PN8580

[51] Int. Cl.$^6$ .................................. B63H 1/26; F01D 1/02
[52] U.S. Cl. .................................. 416/223 R; 416/DIG. 2; 415/206

[58] Field of Search .................................. 415/71, 72, 73; 416/176, 177, 223 R, 223 B, 234, DIG. 2

[56] References Cited

U.S. PATENT DOCUMENTS 2,165,808  7/1939  Murphy.
3,082,695  3/1963  Buschhorn.
4,540,334  9/1985  Stahle.

OTHER PUBLICATIONS

Derwent Abstract Accession No. 89–157673/21, SU 1437579 A (Lengd Kalinin Poly) Nov. 15, 1988.

*Primary Examiner*—John E. Ryznic
*Attorney, Agent, or Firm*—Ladas & Parry

[57] ABSTRACT

A rotor (18) for use with a fluid flow generator or reactor, the rotor being intended to rotate about a central axis (19) and having a surface which defines an arcuate fluid pathway for fluid flow about the central axis about which the rotor is able to rotate, wherein the surface has the configuration of a logarithmic curve substantially conforming to the mathematical progression known as the Golden Section or the Fibonacci Progression.

33 Claims, 14 Drawing Sheets

ROTOR WITH LOGARITHMIC SCALED SHAPE

BACKGROUND OF THE INVENTION

The present invention relates to a rotor which is intended to induce fluid flow and/or to be influenced by fluid flow and can have relevance to pumps for inducing fluid flow and torque generators which are responsive to fluid flow such as turbines.

Generally, devices which are influenced by fluid flow in the production of torque or alternatively which can induce fluid flow utilise a rotor which is rotatably supported in a housing in order to react to, or to generate fluid flow. Such rotors in the simplest forms comprise a set of radial vanes mounted to a backing plate or a set of propeller or turbine blades supported from a shaft. The principal difficulty with previous arrangements however, has been turbulence created within the fluid flow which reduces the efficiency and in extreme circumstances, in the case of liquids, can result in cavitation, which not only reduces the operational efficiency of the pump but can result in inefficiencies and destructive influences upon the structure of the rotor and the support housing and therefore can also result in significant wear and noise.

It is an object of this invention to provide a rotor which can react to or induce fluid flow which reduces the degree of extraneous turbulence which is exerted upon the fluid in its passage past the rotor with the resultant energy loss. In order to effect this the surfaces of the rotor are intended to provide a fluid pathway which conforms generally to the curve of a logarithmic configuration substantially conforming to the Golden Section.

All fluids when moving under the forces of nature, tend to move in spirals or vortices. These spirals or vortices generally comply to a mathematical logarithmic progression known as the Golden Section or the Fibonacci Progression. The invention enables fluids to move over the surfaces of the rotor in their naturally preferred way, thereby reducing inefficiencies created through turbulence and friction which are normally found in apparatus commonly used for flow and torque generators which are responsive to fluid flow and as a result reducing the likelihood of wear.

SUMMARY OF THE INVENTION

Accordingly the invention resides in a rotor for use with a fluid flow generator or reactor, said rotor being intended to rotate about a central axis and having a surface which defines an arcuate fluid pathway for fluid flow about the central axis about which the rotor is able to rotate, wherein the surface has the configuration of a logarithmic curve substantially conforming to the Golden Section.

According to a preferred feature of the invention the curvature of the surface is transverse to the central axis.

According to a further preferred feature of the invention the curvature of the surface can be in a direction parallel to the central axis.

According to a further preferred feature of the invention the curvature of the surface is both transverse to the central axis and is parallel to the direction of the central axis to define a three dimensional surface conforming to the Golden Section.

According to a further preferred feature of the invention the fluid pathway has a spiral configuration. In particular the configuration takes the form of a helix or a volute.

According to a further preferred feature of the invention the fluid pathway comprises a duct. According to a further preferred feature of this feature the cross-sectional area of the duct varies logarithmically in substantial conformity to the Golden Section.

According to a further preferred feature of the invention the fluid pathway has the configuration conforming to the internal configuration of a shell of the phylum Mollusca, class Gastropoda or Cephalopoda. According to particular forms of the invention the surface conforms to he internal configuration of shells selected from the genera Volutidea, Argonauta, Nautilus, Conidea or Turbinidea.

According to a further preferred feature of the invention the fluid pathway has the configuration conforming to the external configuration of a shell of the phylum Mollusca, class Gastropoda or Cephalopoda. According to particular forms of the invention the surface conforms to the external configuration of shells selected from the genera Volutidea, Argonauta, Nautilus, Conidea or Turbinidea.

According to a further preferred feature of the invention the rotor is adapted to be subjected to a fluid flow over said surface to induce a rotation of the rotor about the central axis. According to an alternative preferred feature of the invention the rotor comprises an impeller which is adapted to be driven to rotate about its central axis to induce fluid flow over the surface.

One embodiment of the invention comprises a fluid flow reactor having a rotor which is rotatably mounted and is adapted to be subjected to a fluid flow wherein the rotor is of the form as described above. The fluid may comprise a liquid or a gas and in the latter case may comprise air.

Another embodiment of the invention comprises a fluid flow generator having a rotor which is caused to rotate by a drive means in order to generate said fluid flow, and the rotor takes the form of a rotor as described above. The fluid may comprise a liquid or a gas and in the latter-case may comprise air.

According to a particular embodiment, the invention resides in a pump comprising a body defining a chamber, said chamber having a central axis, an outlet formed in the wall of the chamber, and an opening formed in the wall which is concentric with the central axis; a rotor rotatably supported in the chamber for rotation about said central axis; a drive shaft concentric to the central axis being adapted to be driven by a drive shaft; said rotor having a sub-chamber having an inlet which is concentric with the central axis and which is received in the opening and having a outlet which is directed substantially tangentially or circumferentially; the surface defined by the inner face of the sub-chamber having a substantially spiral profile between the inlet and outlet wherein the curvature of the surface has the characteristics of a logarithmic curve substantially conforming to the Golden Section.

According to a preferred feature the opening is directed substantially in opposed relation to the direction of rotation.

According to a preferred feature the opening is directed substantially in the direction of rotation.

According to a preferred feature the surface comprises a duct.

According to a further preferred feature of the previous feature the cross-section of the duct generally increases between the inlet and outlet where the variation in cross-section of the duct varies logarithmically in substantial conformity to the Golden Section.

According to a preferred feature of the embodiment the sub-chamber of the rotor has the configuration of the interior of shells of the phylum Mollusca; classes Gastropoda or Cephalopoda. In particular examples of the embodiment the surface has the configuration of the interior of shells selected from the genera Volutidea, Conidea, Turbinidea, Argonauta, or Nautilus.

According to a further preferred feature the chamber is of a generally spherical or ellipsoidal configuration, where the curvature of the internal face of the chamber between the opening and the outlet conforms to a logarithmic curve substantially conforming to the characteristics of the Golden Section.

BRIEF DESCRIPTION OF THE DRAWINGS

The invention will be more fully understood in the light of the following description of several specific embodiments. The description is made with reference to the accompanying drawing of which.

DETAILED DESCRIPTION

Each of the embodiments are directed to a rotor which can be utilised to generate fluid flow as in the case of a pump or which can be responsive to fluid flow to produce a torque as in the case of a turbine or motor.

As stated previously all fluids when moving under the influence of the natural forces of Nature, tend to move in spirals or vortices. These spirals or vortices generally comply to a mathematical progression known as the Golden Section or the Fibonacci Progression.

Each of the embodiments serves to enable fluids to move in their naturally preferred way, thereby reducing inefficiencies created through turbulence and friction which are normally found in apparatus commonly used for inducing fluid flow and in torque generators which are responsive to fluid flow. Previously developed technologies have generally been less compliant with natural fluid flow tendencies.

Figure 1:
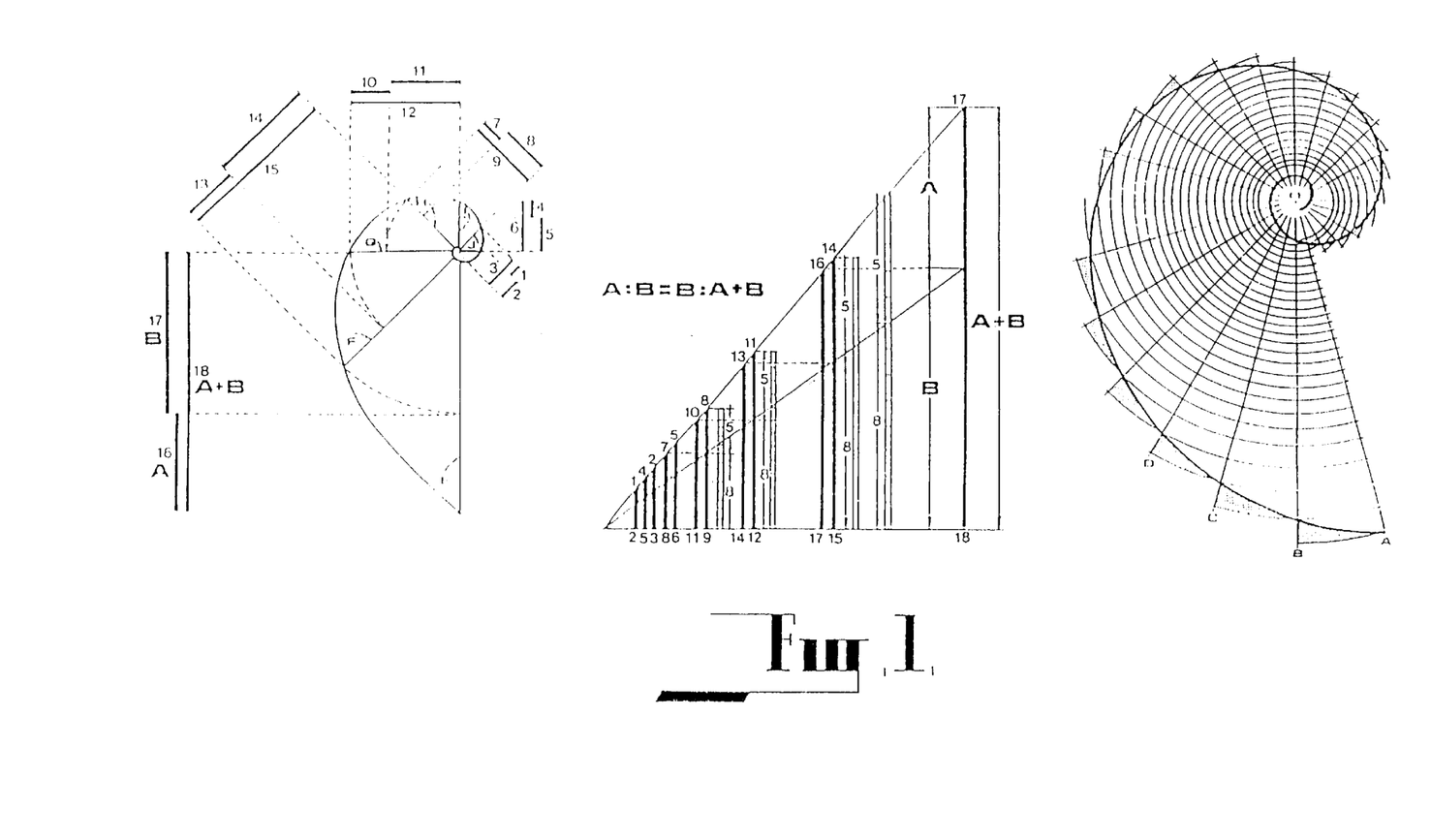
FIG. 1 illustrates the form of the Golden Section.

The rotors of each of the embodiments described herein are generally designed in all respects, in accordance with the Golden Section and therefore it is a characteristic of each of the embodiments that the rotor provides a fluid pathway which is of a spiralling configuration and which conforms at least generally to the characteristics of the Golden Section. The characteristics of the Golden Section are illustrated in FIG. 1 which illustrates the unfolding of the spiral curve according to the Golden Section. As the spiral unfolds the order of growth of the radius of the curve which is measured at equiangular radii (eg E, F, G, H. I and J) is constant. This can be illustrated from the triangular representation of each radius between each sequence which corresponds to the formula of a:b=b:a+b which conforms to the ratio of 5:8 and which is consistent through out the curve.

It is a characteristic of each of the embodiments that the curvature of the surfaces which form the rotor takes a two dimensional or three dimensional shape and which substantially conform to the characteristics of the Golden Section and that any variation in cross-sectional area of the fluid pathway also substantially conforms to the characteristics of the Golden Section. Furthermore it has been found that the characteristics of the Golden Section are found in nature in the form of the external and internal configurations of shells of the phylum Mollusca, classes Gastropoda and Cephalopoda and it is a common characteristic of at least some of the embodiments that the fluid pathway defined by the rotor corresponds generally to the external or internal configuration of shells of one or more of the genera of the phylum Mollusca, classes Gastropoda and Cephalopoda.

It has been found that it is a characteristic of fluid flow that, when it is caused to undergo a fluid flow through a pathway having a curvature substantially conforming to that of the Golden Section that the fluid flow over the surfaces is substantially non-turbulent and as a result has a decreased tendency to cavitate. As a result, fluid flow over the surface is more efficient than has been encountered in previous instances where the pathway does not substantially correspond to that of the Golden Section. As a result of the reduced degree of turbulence which is induced in the fluid in its passageway through such a pathway, the rotor's according to the various embodiments can be used for conducting fluid with less wear and with a greater efficiency than has previously been possible with conventional rotors of equivalent dimensional characteristics.

Figure 2:
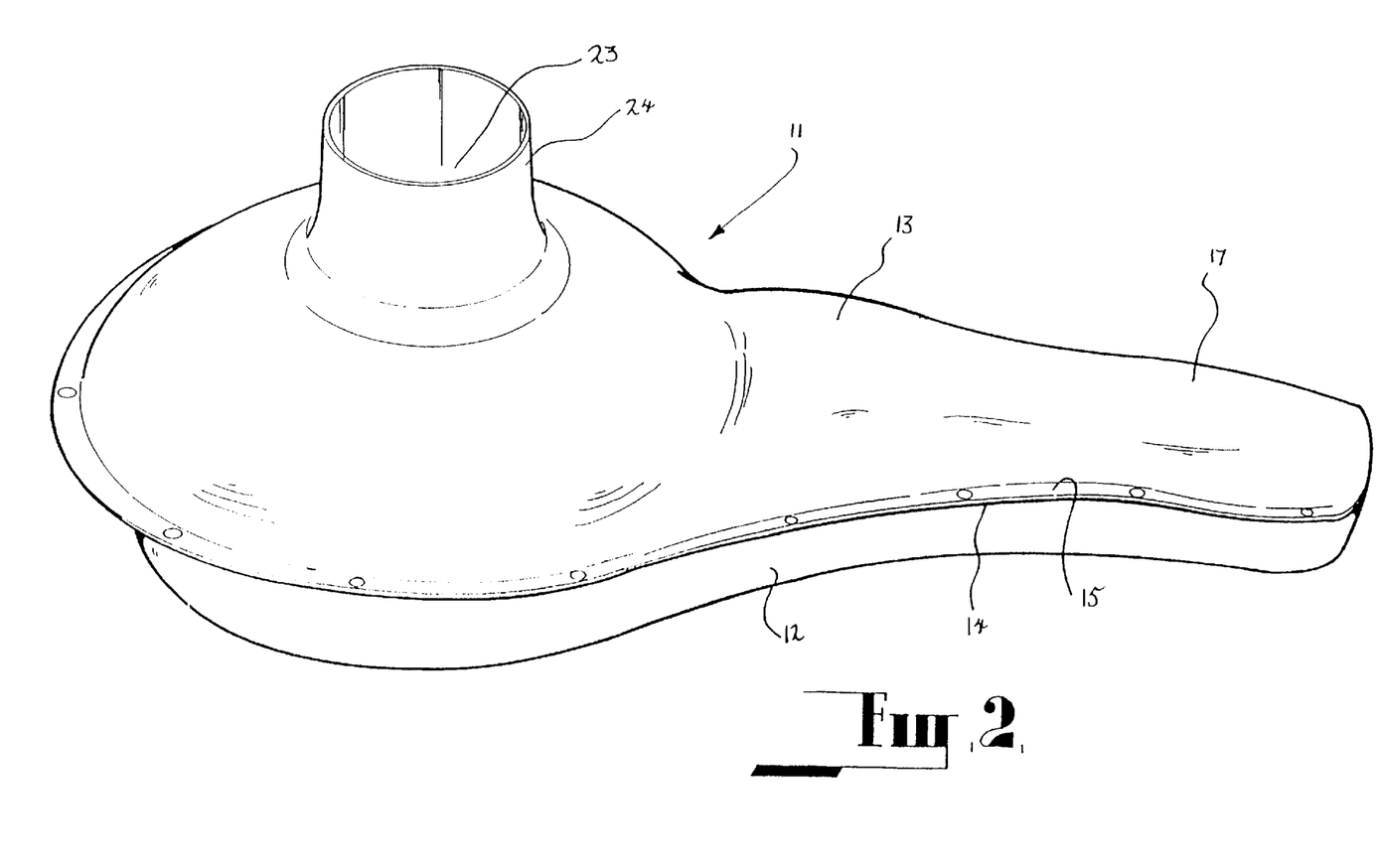
FIG. 2 is a general isometric view of the pump according to the first embodiment.
Figure 3:
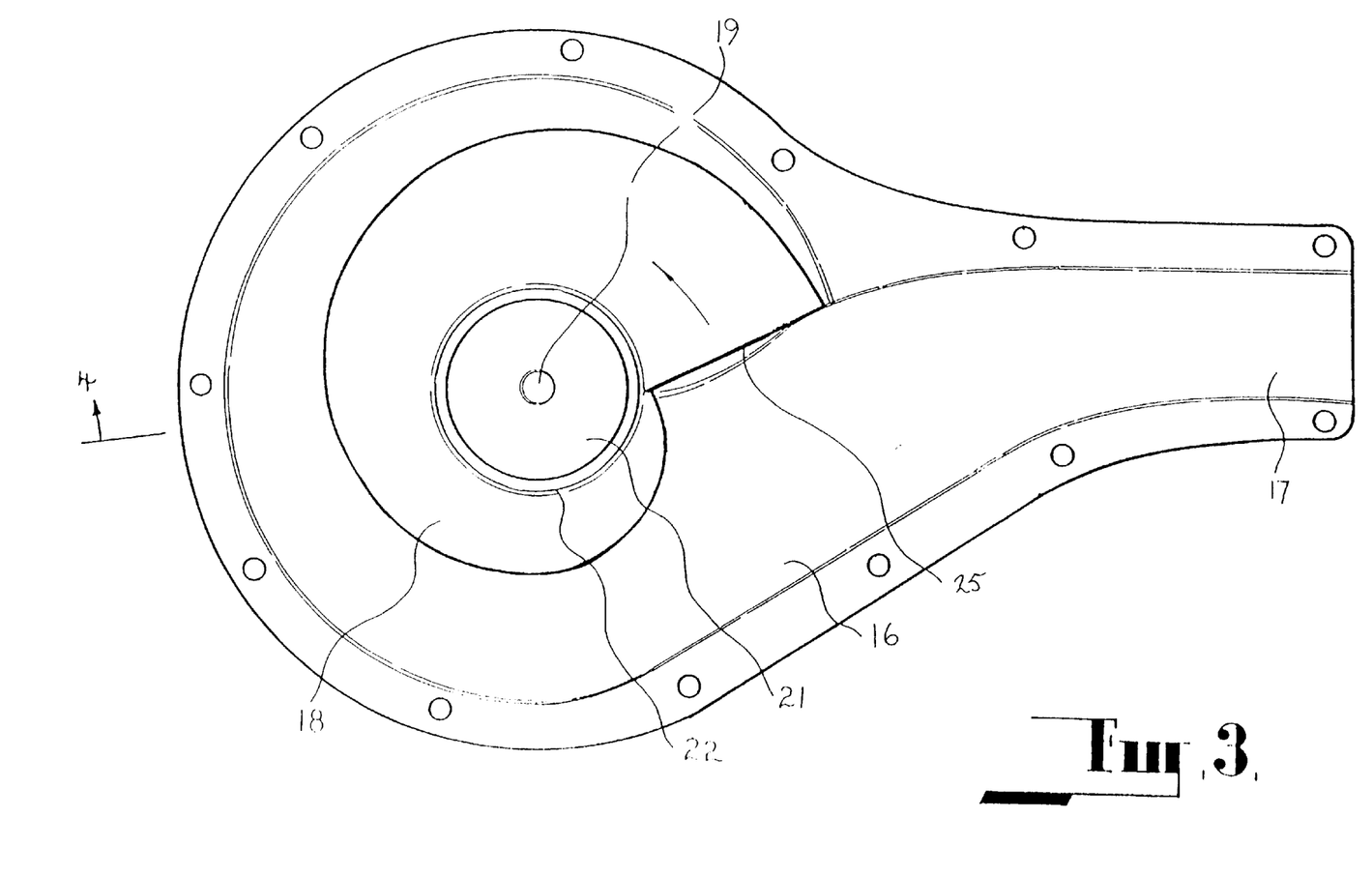
FIG. 3 is an inverted plan view of the upper portion of the pump body of the first embodiment with the rotor in position.
Figure 4:
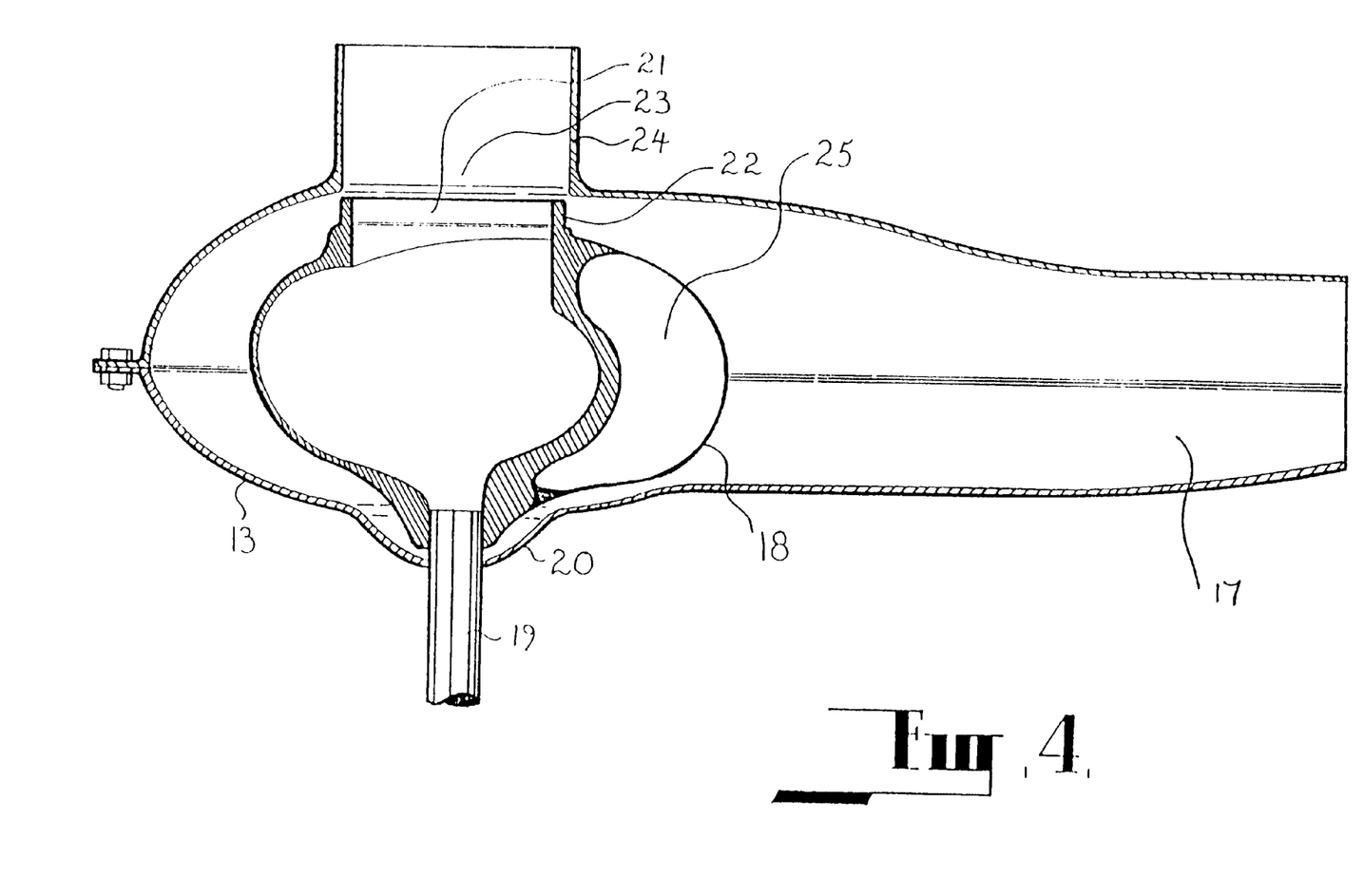
FIG. 4 is a cross-sectional view along line 4—4 of FIG. 3.

The first embodiment which is shown at FIGS. 2, 3 and 4 comprises a pump which can be utilised for delivery of high pressure fluid from the outlet and it is anticipated that one particular use would be as a "jet pump" which can be used in the propulsion of water-borne craft.

The pump according to the first embodiment comprises a body 11 which is formed from two substantially identical halves 12 and 13 which are each provided with a flange 14 and 15 at their abutting edges which can be clamped together by any suitable means. The body defines a main portion which forms a closed chamber 16 which is generally circular in plan but of a substantially elliptical diametrical section with a laterally extending outlet duct 17. The chamber accommodates a rotor 18 supported from a drive shaft 19 which is coincidental with the central axis of the chamber 16 and which is supported by a suitable bearing housing (not shown) provided in one half 12 of the body 11. The rotor 18 has the internal and external configuration of a shell of the phylum Mollusca, class Cephalopoda, genus Nautilus but without the internal partitions or septa which are normally present in nature. The axial face of the rotor opposite the drive shaft 19 is provided with an inlet opening 21 which is defined by an annular flange 22 surrounding the opening 21. The annular wall 22 is concentrically received within an opening 23 provided in the wall of the other half 13 of the body 11 opposite the drive shaft. The opening 23 in the wall of the housing is concentric with the central axis of the chamber and is associated with an inlet duct 24 in which the annular flange 22 on the rotor is closely received.

The outlet 25 of the rotor is defined by an opening which is directed generally tangentially to the central axis and the face of which is generally parallel with a radial axis of the chamber 16. The internal sub-chamber provided by the interior of the rotor comprises a duct of a generally spiral configuration and of increasing cross-section between the inlet and the outlet in which the variation in cross-section substantially conforms within the formula of the Golden Section as does the curvature of the surface of the duct.

In use the rotor is caused to rotate such that the opening defining the outlet is directed opposite to the direction of travel and the edges of the opening 24 define the trailing edge of the rotor.

As a result of preliminary tests and trials it has been found that in use that a pump according to the first embodiment is able to very efficiently generate a high flow rate of liquid from the outlet 17 with minimal cavitation and at a relatively low rotation rate. As a result, it is believed that the rotor will be able to conduct fluids at a higher velocity with less turbulence and cavitation than would normally be expected of conventional pumps of an equivalent capacity. Since the degree of cavitation which is be produced is significantly less than one would expect of a conventional pump of equivalent dimensions operating at the same speed and therefore it is anticipated that this will result in a reduced erosion and wear of the components of the pump and in particular the rotor. Furthermore, it is believed that the expanding nature of the cross-section of the sub-chamber of the rotor between the inlet and the outlet will reduce the likelihood of foreign matter clogging or choking the passage through the rotor which is a very common experience with conventional pumps.

According to a variation of the first embodiment the rotor is caused to rotate such that the outlet 25 is directed in the direction of rotation.

According to a further variation of the first embodiment the internal partitions or windings which exist in Nature in the shell of the phylum Mollusca, class Cephalopoda, genus Nautilus in addition to the septa previously referred to need not be present and as a result the internal configuration of the surface of the rotor will be in substantial conformity with the external shape of a shell of the phylum Mollusca, class Cephalopoda, genus Nautilus.

Figure 5:
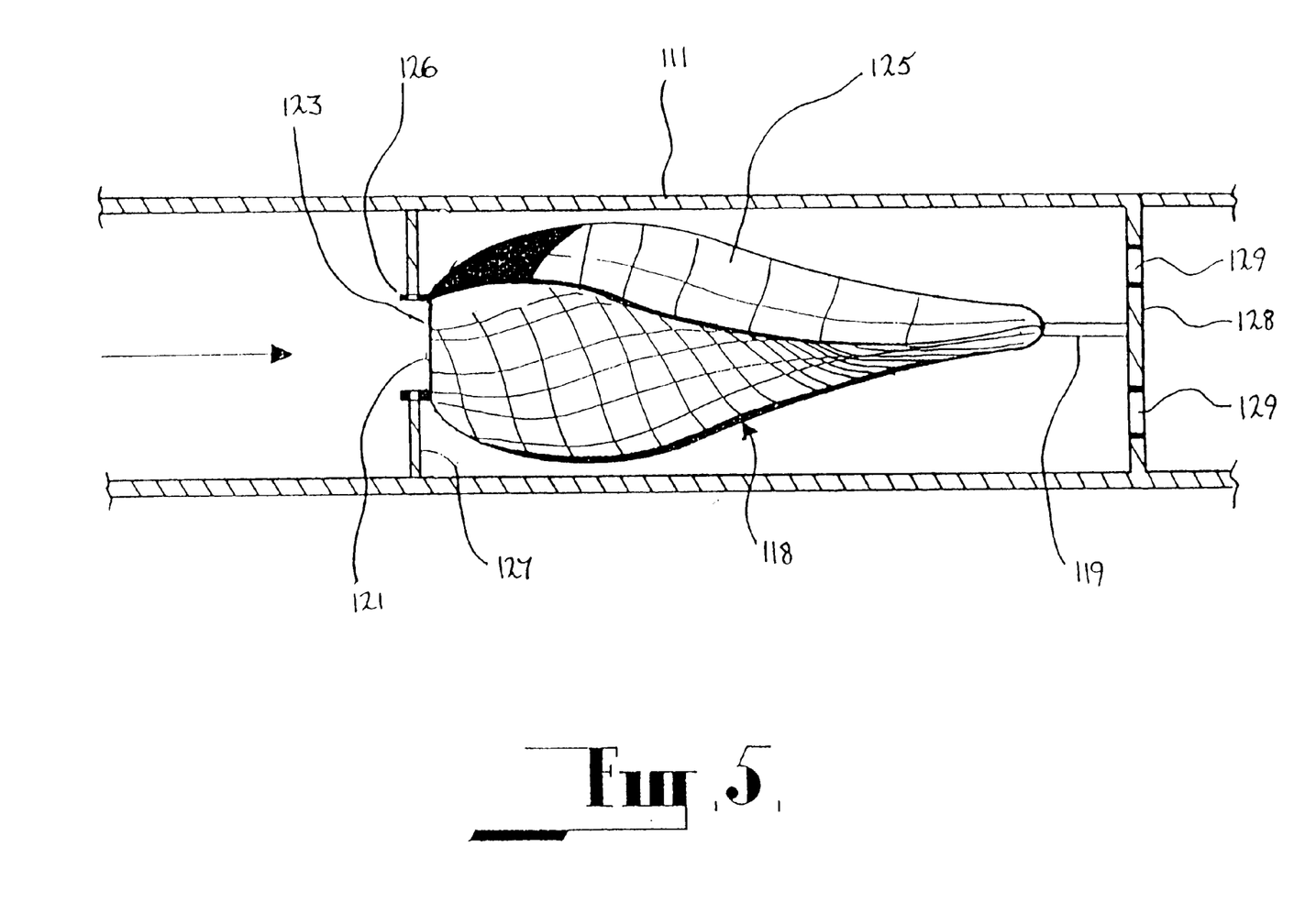
FIG. 5 is a schematic sectional view of the second embodiment.
Figure 7:
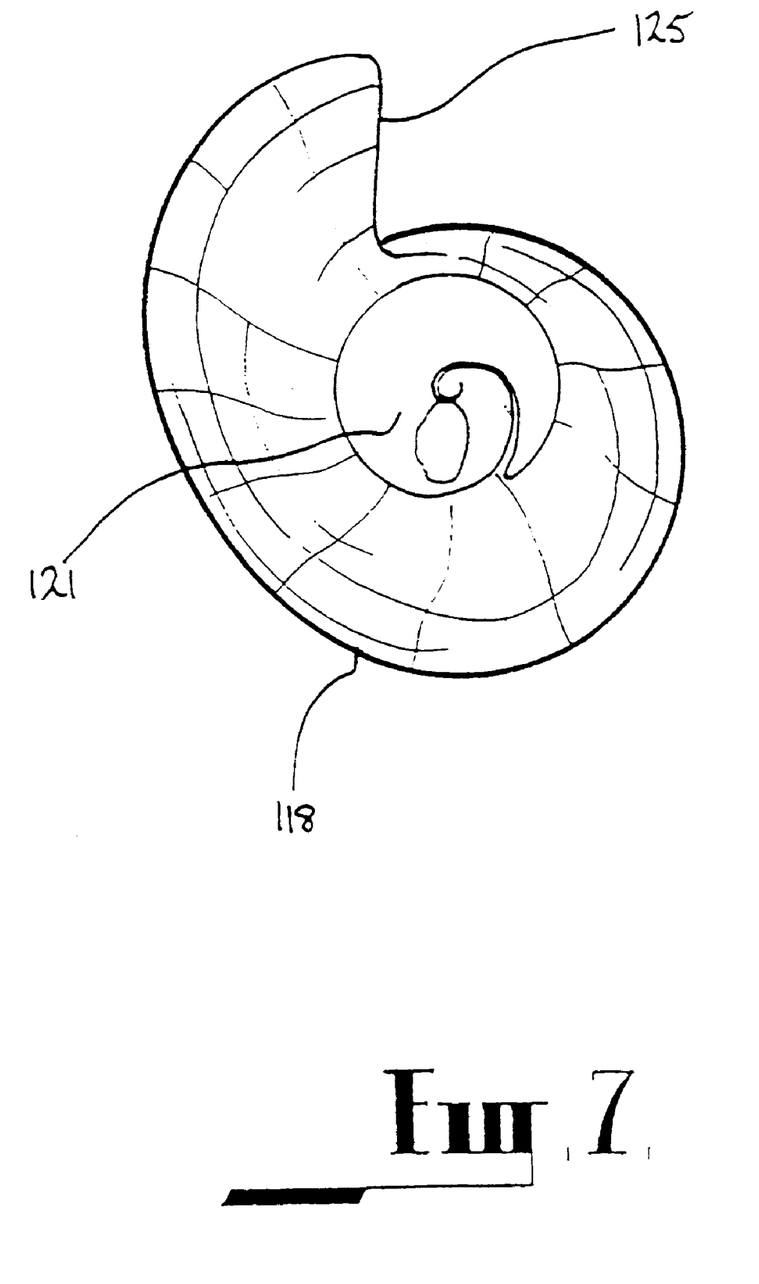
FIG. 7 is an end elevation of the rotor of the second embodiment.
Figure 8:
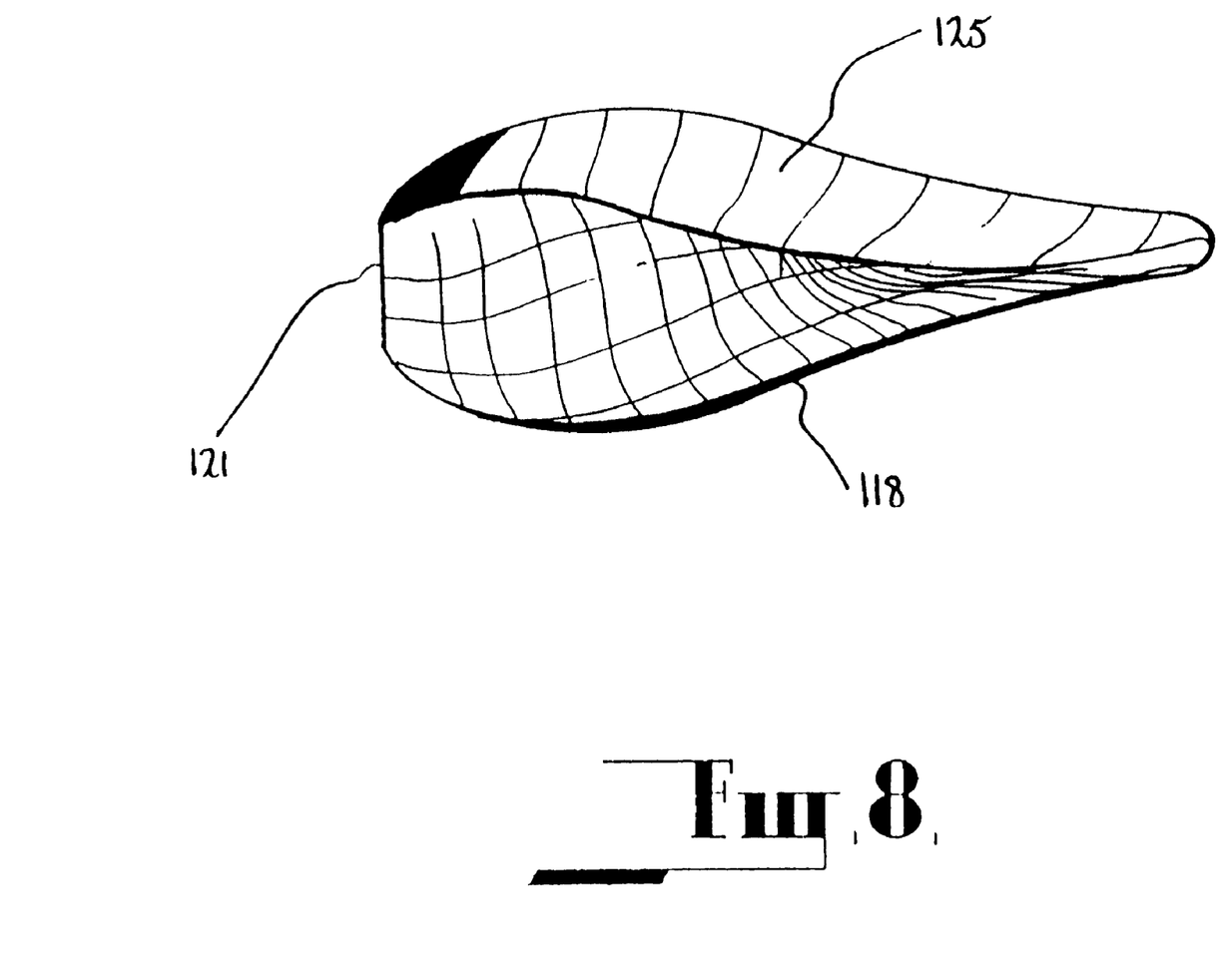
FIG. 8 is a side elevation of the rotor of FIG. 7.
Figure 9:
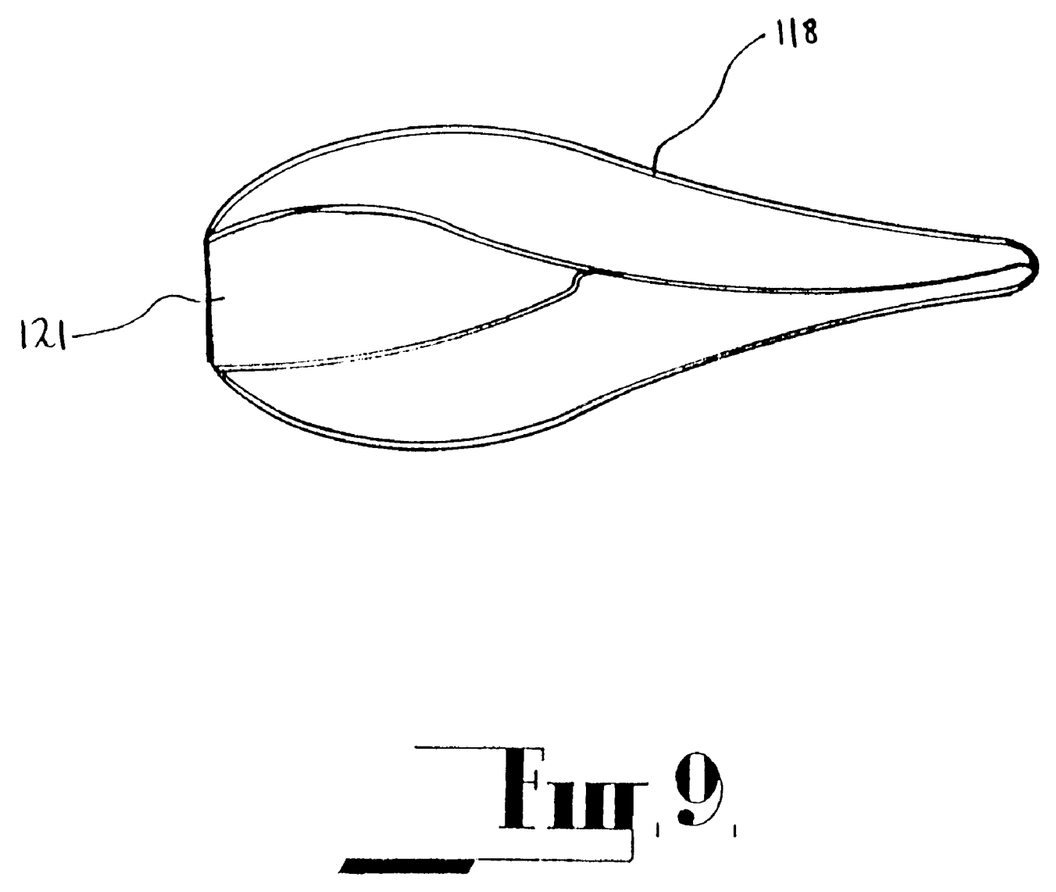
FIG. 9 is a sectional side elevation of the rotor of FIGS. 7 and 8.

The second embodiment as shown at FIG. 5 also comprises a pump. The pump comprises a tubular body 111 which rotatably supports a rotor 118 which generally takes the form of a shell of the phylum Mollusca class Gastropoda, genus Volutidae as shown at FIGS. 7, 8 and 9 where the inner end of the shell is cut away as shown at FIG. 7 to provide an entry 121 into the interior of the shell. The mouth of the shell serves as the outlet 125 for the rotor 118. The entry 121 is associated with a suitable bearing support 126 which is provided within the body 111 whereby the rotor is supported from the body 111 by the support such that the rotor is rotatable within the body about its central axis which is substantially coincidental with the central axis of the body. The support comprises a first partition 127 which extends across the body and is provided with a central opening 123 which is in alignment with the entry 121 of the rotor and which is surrounded by the bearing support 126 for the rotor. In addition the rotor is supported at its other end by a spindle 119 which is rotatably supported from a second partition 128 provided within the body which is spaced from the first partition 126. A suitable drive means (not shown) is connected to the bearing support 126 of the rotor 118 to cause rotation of the rotor whereby the outlet is directed in opposed relation to the direction of rotation. The second partition 128 is provided with a set of apertures 129 to allow fluid flow through it.

Figure 6:
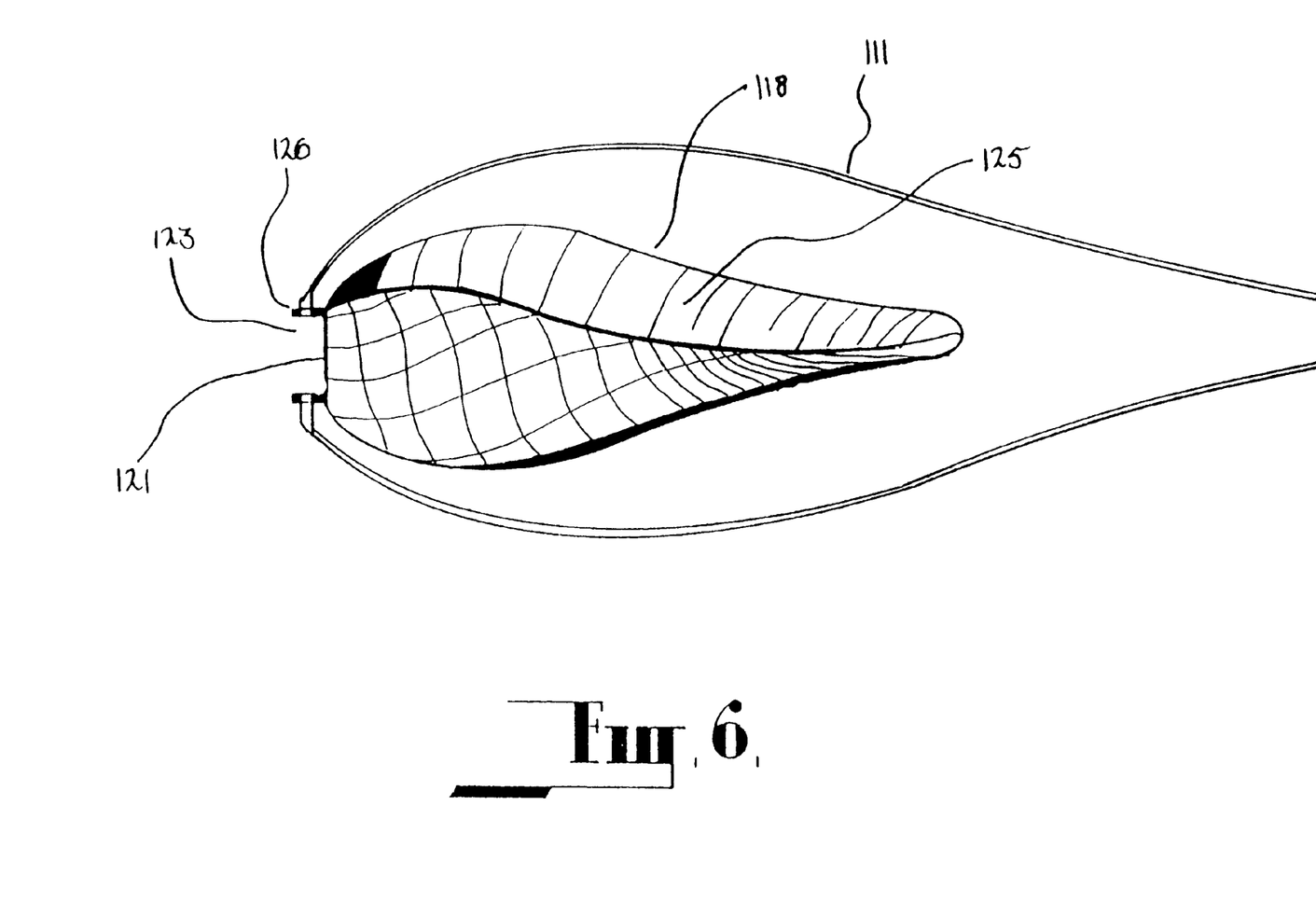
FIG. 6 is a schematic sectional view of a variation of the second embodiment.

A variation of the second embodiment is shown at FIG. 6 where side walls of the body 111 are curved such that the cross-section of the body 111 decreases in the direction of the outlet 125 of the body and where that variation in cross10 section is in substantial conformity with the Golden Section.

According to a variation of both forms of the second embodiment the rotor is caused to rotate such that the outlet 125 is directed in the direction of rotation As an alternative support arrangement for both forms of the second embodiment, the rotor may be supported from a shaft which is rotatably supported from the housing.

According to a further variation of both forms of the second embodiment the internal partitions or windings which exist in Nature in the shell of the phylum Mollusca, class Gastropoda, genus Volutidae need not be present and as a result the internal configuration of the surface of the rotor will be in substantial conformity with the external shape of a shell of the phylum Mollusca, class Gastropoda, genus Volutidae.

Figure 10:
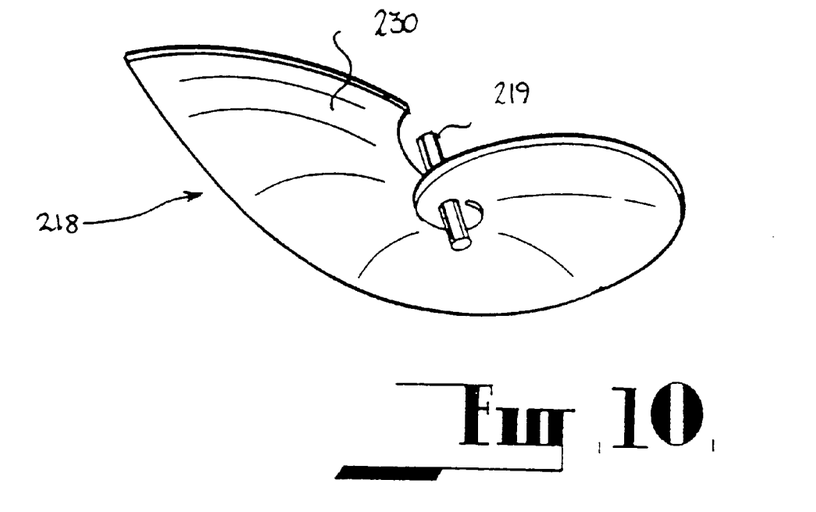
FIG. 10 is a schematic illustration of a rotor according to the third embodiment.

The third embodiment of the invention is illustrated at FIG. 10 comprises a rotor 218 having a single vane 230 which has a helical configuration conforming to that of the Golden Section and which is supported upon a central shaft 219. The rotor 218 according to the embodiment may be located within a fluid passageway (not shown) between an inlet and outlet and subjected to a fluid flow between the inlet and the outlet and as a result of such fluid flow the rotor will be caused to rotate to generate a torque in the shaft. Similarly if the rotor is induced to rotate by application of a torque to the support shaft 219 then a fluid flow will be generated as a result of such rotation. The substantial conformity of the curvature of the surface of the rotor to the Golden Section results in an improved efficiency of the rotor.

Figure 11:
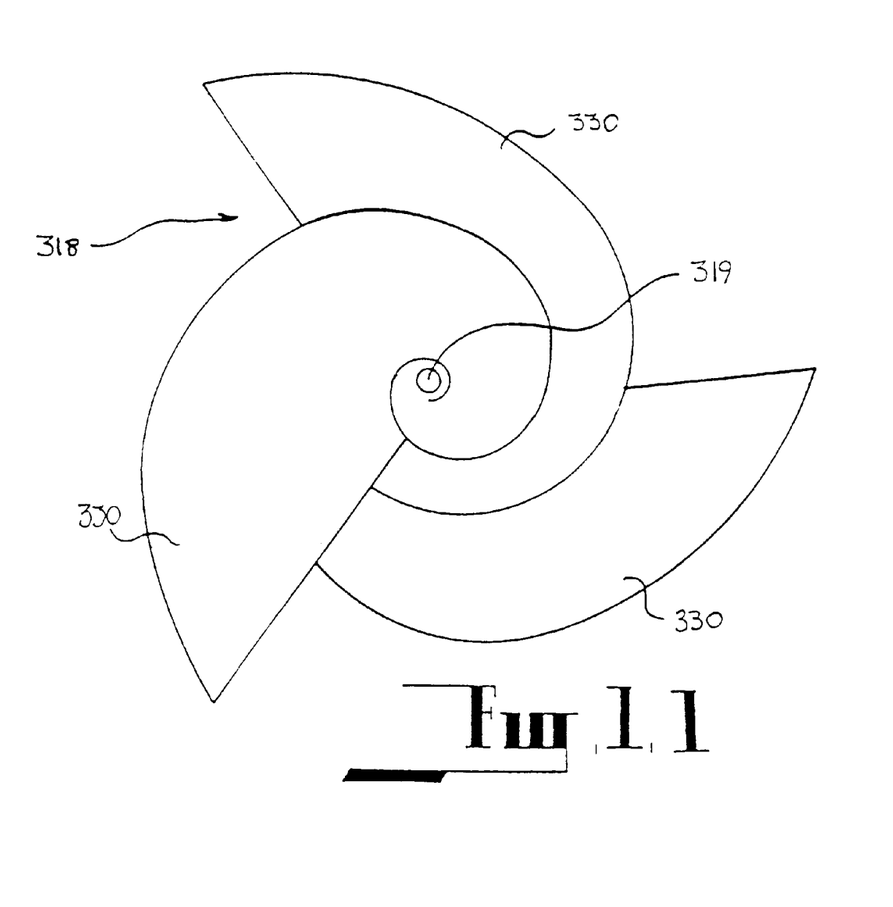
FIG. 11 is a plan view of a rotor according to the fourth embodiment.

The fourth embodiment of the invention as shown at FIG. 11 is similar to the first embodiment with the exception that the rotor 318 comprises a plurality of vanes 330 which are of a similar form to the vane of the first embodiment are mounted to a single shaft 319 where the vanes 330 are mounted to the shaft 319 to be equiangularly spaced about the central axis of the shaft.

Figure 12:
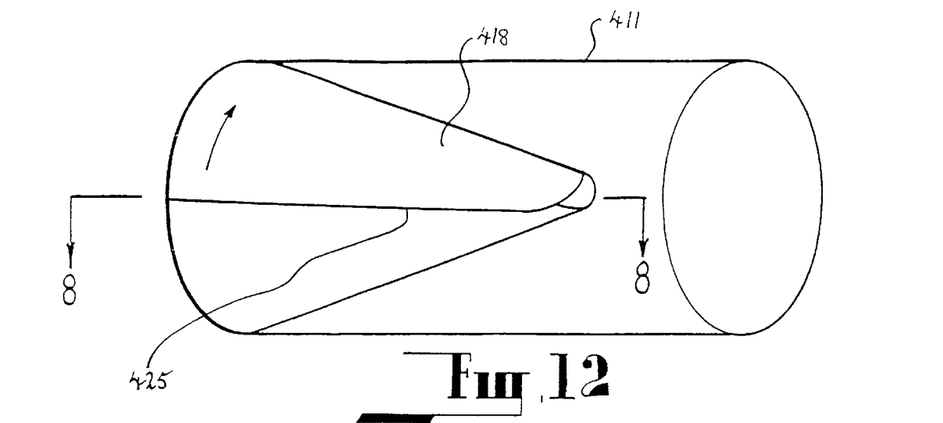
FIG. 12 is a schematic view of a pump according to the fifth embodiment.
Figure 13:
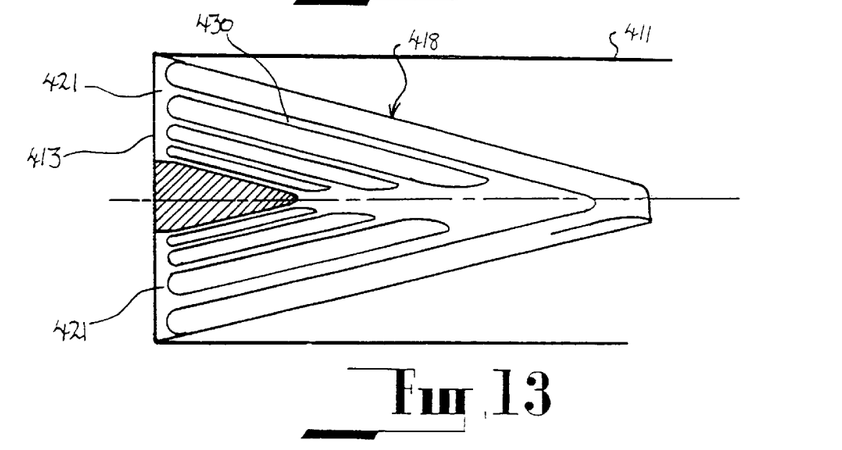
FIG. 13 is a sectional view of the fifth embodiment shown at FIG. 12.
Figure 14:
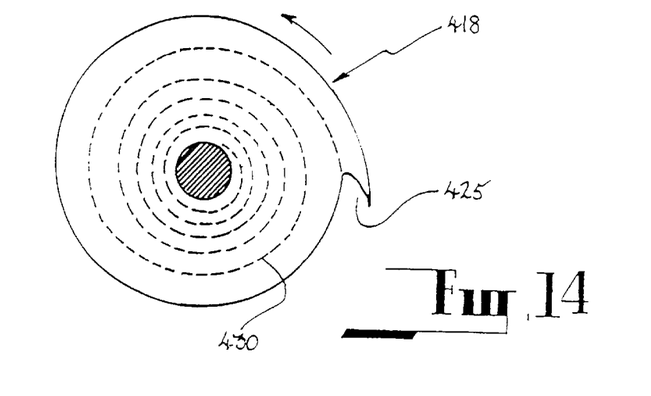
FIG. 14 is an end view of the rotor of the fifth embodiment shown at FIGS. 12 and 13.

The fifth embodiment is illustrated in FIGS. 12, 13, and 14 and is a variation of the second embodiment in which the rotor 418 is supported within a substantially cylindrical housing 411 and is rotatably supported in a fluid pathway. The rotor 418 has generally a similar internal configuration to that of the phylum Mollusca, class Gastropoda, genus Conus or Conidae (ie Cone shell) and has a spiral vane 430 which is of the form of a conical spiral as illustrated in FIGS. 6, 7, and 8 which defines a duct the surfaces of which generally conform to the Golden Section and which defines a duct which increases in cross section generally in conformity to the Golden Section. In one form the rotor may be driven to rotate such that the outlet is in opposed relation to the direction of rotation. Alternatively the rotor may be driven such that the opening is directed in the direction of rotation.

Figure 15:
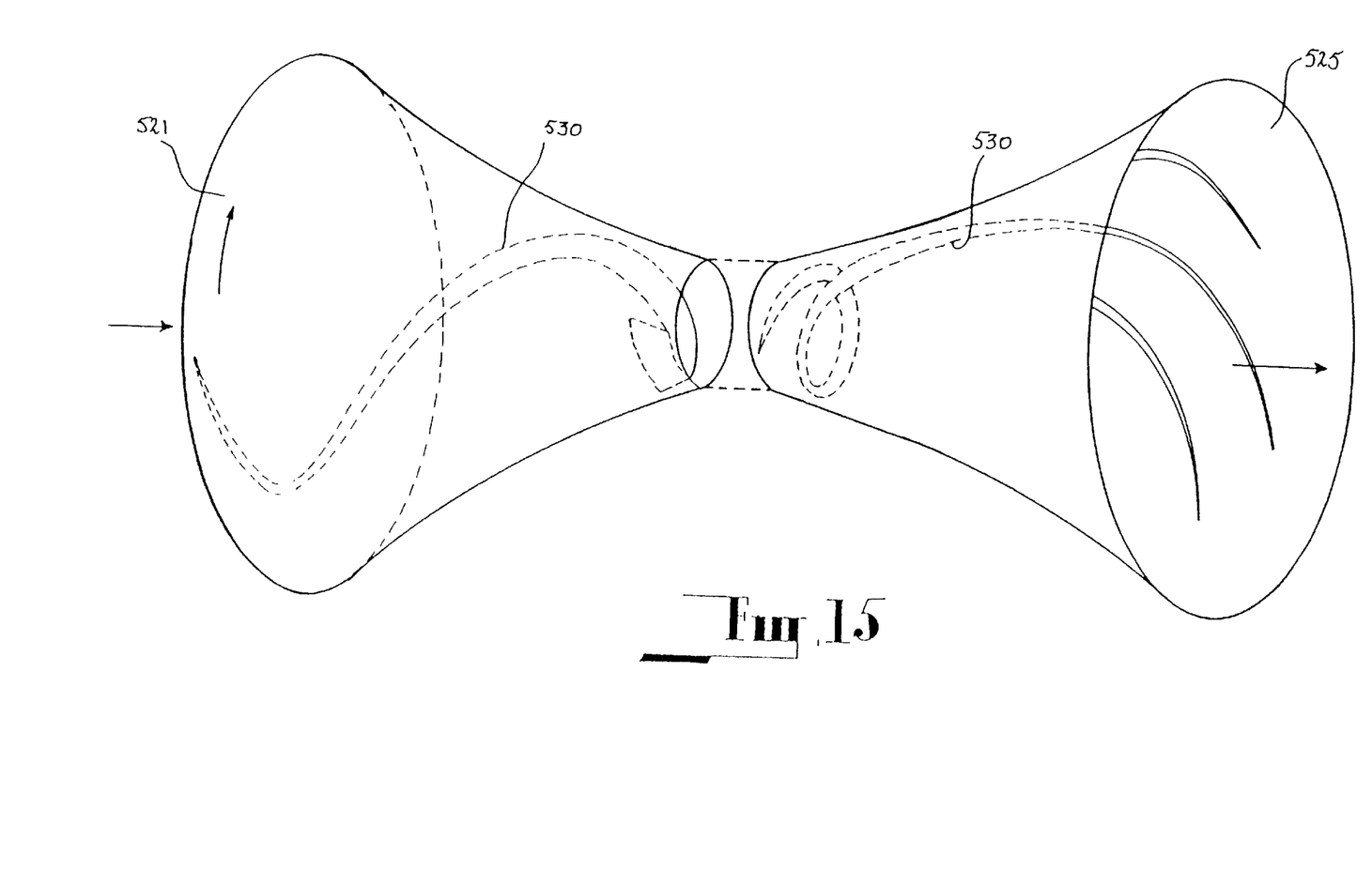
FIG. 15 is a schematic view of a rotor according to the sixth embodiment.

FIG. 15 illustrates a sixth embodiment of the invention which does not duplicate the internal configuration of a shell of the phylum Mollusca. The rotor of the embodiment comprises a generally conical inlet 521 which provides a convergent entry which communicates at its inner end with a conical outlet 525 which provides a divergent exit. Both the internal surface of the inlet 521 and the outlet 525 are provided with one or more spiral vanes 530 which substantially have the characteristics of the Golden Section. As does the contraction of the inlet 521 and the expansion of the outlet 525.

Figure 16:
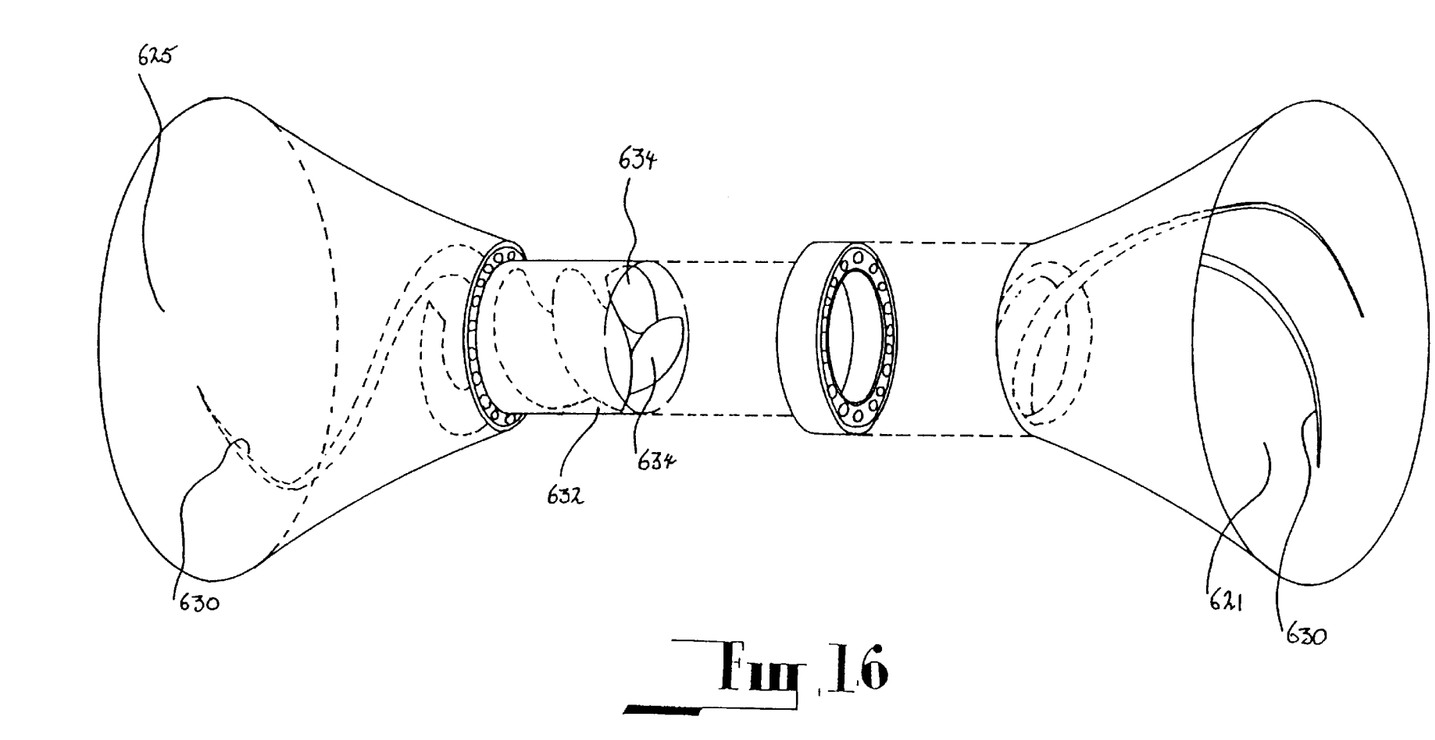
FIG. 16 is a schematic view of a rotor according to the sixth embodiment.

FIG. 16 illustrates a seventh embodiment which is a variation of the previous embodiment whereby the inlet 621 and outlet 625 of the rotor are interconnected by a cylindrical zone 632 which is of generally cylindrical configuration and which accommodates a set of coaxial angularly equidistant helical vanes 634 each of which substantially conform to the characteristics of the Golden Section and which serve to further influence the fluid flow between the inlet and the outlet. To further enhance the fluid flow through the inlet 621 and from the outlet 625 the interior face of the inlet 621 and the interior face of the outlet 625 is provided with a plurality of spiral vanes 630 which also have a curvature conforming to that of the Golden Section.

Figure 17:
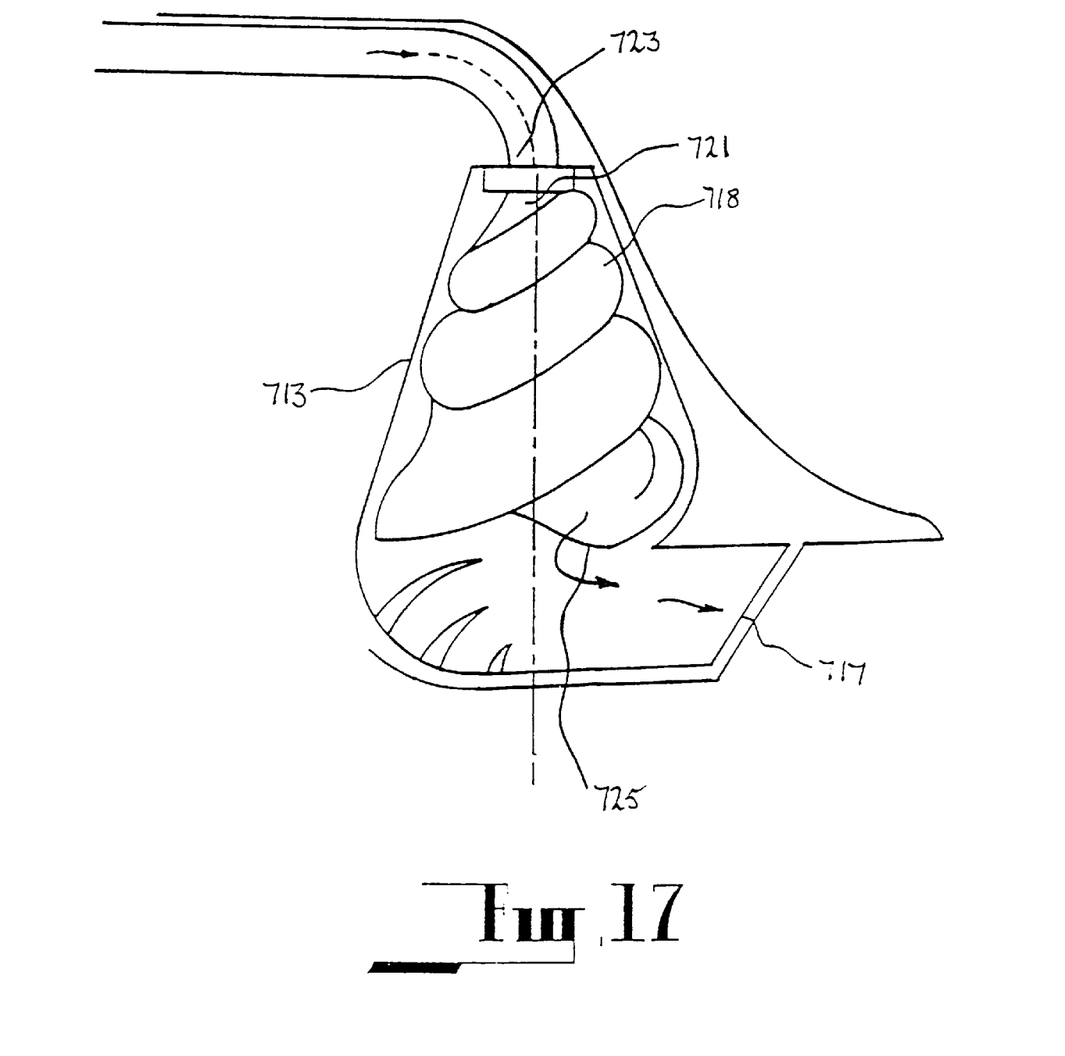
FIG. 17 is schematic sectional view of the seventh embodiment of the invention.

The seventh embodiment of the invention as shown in FIG. 17 is a variation of the first embodiment and also comprises a pump having a rotor 718 supported within a housing 713. The rotor 718 has an internal configuration which generally corresponds to the configuration of the phylum Mollusca, class Gastropoda, genus Turbinidea and is provided with an inlet which comprises an opening 721 provided at the inner end or vertex of the shell at which position the duct formed within the shell is of the smallest diameter. The outlet 725 of the rotor comprises the mouth of the shell. The rotor is caused to rotate about it's central axis such that the outlet 725 trails the rotation. The housing 713 has an inlet 723 which communicates with the inlet 721 of the rotor and an outlet 717 which communicates with the outlet 725 of the rotor. It has been found that as a result of rotation of the rotor 718 where the outlet 725 defines the trailing edge, a fluid flow is induced from the inlet 721 to the outlet 725 and that the fluid flow through the rotor is substantially non-turbulent even at high revolutionary speeds. To further enhance the fluid flow through the housing, from the outlet 725 of the rotor the interior face of the housing 713 in the region of the outlet 717 may be provided with a plurality of spiral vanes which also have a curvature substantially conforming to that of the Golden Section.

According to a variation of the seventh embodiment the rotor may be driven such that the outlet 725 is directed in the direction of rotation of the rotor.

A further embodiment of the invention which may take a variety of forms involves a rotor having a external surface which has a curvature conforming generally to that of the Golden Section. The rotor may have the external configuration of shells of the phylum Mollusca, classes Gastropoda or Cephalopoda. Particular examples of the rotors have the configuration corresponding to the external shape of shells of the genera Volutidea, Conidea and Turbinidea. It has been found that when such rotors are mounted in substantial conformity with the arrangements shown and described in relation to the first, second, fifth and seventh embodiments but where the fluid flow is directed over the external surface that the advantages referred to above can be achieved A further embodiment of the invention comprises a somewhat conventional centrifugal pump with a variation to the rotor such that it conforms to the requirements of the invention. The variation comprises forming the vanes of the rotor such that they have a curvature which generally conforms to the characteristics of the Golden Section. Such curvature may be two dimensional or three dimensional in order that the rotor will conform to the existing requirements of a conventional pump. As a result at least some of the advantages of the invention can be at least partially achieved by replacing the conventional rotor of an existing pump with a rotor according to the embodiment It is a common characteristic of each of the embodiments described above that they can be used as a rotor which can be mechanically caused to rotate to provide a pump to induce fluid flow in a non-turbulent manner between an inlet and an outlet or alternatively as a rotor of a turbine or like motive power means to produce a torque and which permits the passage of fluid between the inlet and outlet in a substantially non-turbulent, more efficient manner than has been possible with conventional pumps or turbines of equivalent capacity.

It is a characteristic of the invention that the rotor as generally described in relation to the invention as described in relation to each of the embodiments can operate effectively in chambers which have both small and large tolerances or spacings between the chamber in which the rotor is received and it has been found that in its use with a pump the rotor need not be accommodated within a chamber. In this regard a rotor of the form described in relation to the first, second, fourth, fifth and seventh embodiments is able to be used without a chamber by being supported in the body of fluid into which fluid is to be delivered and having its inlet connected to the source of fluid, where rotation of the rotor within the body of fluid will cause fluid to be pumped from the source.

In addition it is a characteristic of the invention that the rotor of the invention and each of the embodiments can be used with gaseous, liquid and slurry forms of fluid medium.

It is a further characteristic of the invention that the flow of fluid over the surface of the rotor results in significantly less friction and impact forces being imposed upon the surface and the rotor. As a result of this and the reduced turbulence created by the rotor there is less heat and noise generated as a result of the action of the rotor and thus imparted into the fluid. In addition the rotor requires less energy to effect similar flow rates to conventional pumps. This means that the rotor when used in a pump can be driven by a smaller drive motor and/or at a lower speed. However because of the nature of the surface of the rotor it is also more effective at high speeds than conventional rotors because of the reduced friction and likelihood of cavitation.

In the case of the first, second, fourth and seventh embodiments the inlet provides the minimum clearance for the fluid entering the rotor and as a result any materials which are able pass into the inlet will be able to pass through the duct provided through the rotor which reduces the possibility of the rotor becoming clogged.

The rotor of the invention has application to use in pumps, turbines, and fluid powered motors and can be used to advantage in any proposed application of such, at least because of the enhanced fluid flow, reduced friction, and reduced heat gain when used in a pump and heat loss when used as a turbine.

It should be appreciated that the scope of the present invention need not be limited to the particular scope described above.

I claim:

1. A rotor for use with a fluid flow generator or reactor, said rotor being intended to rotate about a central axis and having a surface which defines an arcuate fluid pathway for fluid flow about the central axis about which the rotor is able to rotate, wherein the surface has the configuration of a logarithmic curve substantially conforming to the Golden Section.

2. A rotor as claimed at claim 1 wherein the curvature is transverse to the central axis.

3. A rotor as claimed at claim 1 wherein the curvature of the surface can be in a direction parallel to the central axis.

4. A rotor as claimed at claim 1 wherein the curvature of the surface is both transverse to the central axis and is parallel to the direction of the central axis to define a three dimensional surface conforming to the Golden Section.

5. A rotor as claimed at claim 1 wherein the fluid pathway has a spiral configuration.

6. A rotor as claimed at claim 5 wherein the spiral configuration is in the form of a helix or a volute.

7. A rotor as claimed at claim 1 wherein the fluid pathway comprises a duct.

8. A rotor as claimed at claim 7 wherein the cross-sectional area of the ducts varies logarithmically in substantial conformity to the Golden Section.

9. A rotor as claimed at claim 1 wherein the fluid pathway has the configuration generally conforming to the internal configuration of a shell of the phylum Mollusca, class Gastropoda or Cephalopoda.

10. A rotor as claimed at claim 9 wherein the configuration of the surface generally conforms to the internal configuration of a shell selected from the genera Volutidea, Conidea or Turbinidea.

11. A rotor as claimed at claim 9 wherein the configuration of the surface generally conforms to the internal configuration of shells selected from the genera Argonauta or Nautilus with the internal septa removed.

12. A rotor as claimed at claim 8 wherein the internal partitions which exist in the shells in Nature are absent from the interior of the rotor.

13. A rotor as claimed at claim 1 wherein the surface has a configuration generally conforming to the external configuration of a shell of the phylum Mollusca, class Gastropoda or Cephalopoda.

14. A rotor as claimed at claim 13 wherein the configuration of the surface generally conforms to the external configuration of a shell selected from the genera Volutidea, Conidea or Turbinidea.

15. A rotor as claimed at claim 1 wherein the rotor is adapted to be subjected to a fluid flow over said surface to induce a rotation of the rotor about the central axis.

16. A rotor as claimed at claim 1 wherein the rotor comprises an impeller which is adapted to be driven to rotate about its central axis to induce fluid flow over the surface.

17. A fluid flow reactor having a rotor which is rotatably mounted and is adapted to be subjected to a fluid flow wherein the rotor is of the form as claimed at claim 1.

18. A fluid flow reactor as claimed at claim 17 wherein the fluid comprises a liquid.

19. A fluid flow reactor as claimed at claim 17 wherein the fluid comprises a gas.

20. A fluid flow reactor as claimed at claim 19 wherein the fluid comprises air.

21. A fluid flow generator having a rotor which is caused to rotate by a drive means in order to generate said fluid flow, wherein the fluid comprises a liquid and said rotor takes the form of a rotor as claimed at claim 1.

22. A fluid flow generator having a rotor which is caused to rotate by a drive means in order to generate said fluid flow, wherein the fluid comprises a gas and said rotor takes the form of a rotor as claimed at claim 1.

23. A fluid flow generatoras claimed at claim 22 wherein the gas comprises air.

24. A pump comprising a body defining a chamber; said chamber having a central axis, an outlet formed in the wall of the chamber, and an opening formed in the wall which is concentric with the central axis; a rotor rotatably supported in said chamber for rotation about said central axis; a drive shaft concentric to the central axis being adapted to be driven by a drive shaft; said rotor having a sub-chamber having an inlet which is concentric with the central axis and which is received in the opening and having an outlet which is directed generally tangentially or circumferentially; the surface defined by the inner face of the sub-chamber having a substantially spiral profile between the inlet and outlet wherein the curvature of the surface has the characteristics of a logarithmic curve substantially conforming to the Golden Section.

25. A pump as claimed at claim 24 wherein the outlet is directed in opposed relation to the direction of rotation.

26. A pump as claimed at claim 24 wherein the outlet is directed in the direction of rotation of the rotor.

27. A pump as claimed at claim 24 wherein the surface comprises a duct.

28. A pump as claimed at claim 27 wherein the cross-section of the duct generally increases between the inlet and outlet where the variation in cross-section of the duct varies logarithmically in substantial conformity to the Golden Section.

29. A pump as claimed at claim 24 wherein the sub-chamber of the rotor generally has the configuration of the interior of shells of the phylum Mollusca; classes Gastropoda or Cephalopoda.

30. A pump as claimed at claim 29 wherein the surface has the configuration generally conforming to the interior of a shell selected from the genera Volutidea, Conidea or Turbinidea.

31. A pump as claimed at claim 29 wherein the surface has the configuration generally con forming to the interior of a shell selected from the genera Argonauta, or Nautilus with the internal septa removed.

32. A rotor as claimed at claim 30 wherein the internal partitions which exist in the shells in Nature are absent from the interior of the rotor.

33. A pump as claimed at claim 26 wherein the chamber is of a generally spherical or ellipsoidal configuration, where the curvature of the internal face of the chamber between the opening and the outlet conforms to a logarithmic curve substantially conforming to the characteristics of the Golden Section.

* * * * *